(12) United States Patent
Rege et al.

(10) Patent No.: US 7,828,478 B2
(45) Date of Patent: Nov. 9, 2010

(54) APPARATUS AND METHOD FOR THERMAL DETECTION

(75) Inventors: Siddharth S. Rege, Kokomo, IN (US); Joseph E. Harter, Jr., Kokomo, IN (US); Ronald M. Taylor, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 445 days.

(21) Appl. No.: 11/138,532

(22) Filed: May 26, 2005

(65) Prior Publication Data

US 2006/0067378 A1 Mar. 30, 2006

Related U.S. Application Data

(60) Provisional application No. 60/614,376, filed on Sep. 29, 2004.

(51) Int. Cl.
*G01K 1/14* (2006.01)
*G01K 5/02* (2006.01)
*G01J 1/28* (2006.01)

(52) U.S. Cl. ............ 374/141; 374/208; 374/121; 374/124; 374/167; 374/179; 374/137; 250/338.1

(58) Field of Classification Search .......... 374/120, 374/121, 135, 137, 129, 130, 141, 29, 30, 374/100, 111, 112, 124, 132, 142, 148, 166, 374/167, 179, 208, 45; 250/338.1, 353; 340/539.23
See application file for complete search history.

(56) References Cited

U.S. PATENT DOCUMENTS

| | | | | |
|---|---|---|---|---|
| 3,137,170 A | * | 6/1964 | Astheimer | 250/339.04 |
| 3,381,569 A | * | 5/1968 | Hatcher | 356/4.03 |
| 3,548,194 A | * | 12/1970 | Astheimer | 250/349 |
| 3,838,386 A | * | 9/1974 | Chartrain et al. | 439/726 |
| 3,933,044 A | * | 1/1976 | Loper et al. | 374/110 |
| 4,186,748 A | * | 2/1980 | Schlager | 600/549 |
| RE32,166 E | * | 6/1986 | Berge | 451/6 |
| 4,873,442 A | * | 10/1989 | Klatt | 250/334 |
| 4,968,879 A | * | 11/1990 | Clark | 250/227.11 |
| 4,981,369 A | * | 1/1991 | Kumada et al. | 374/28 |
| 4,986,672 A | * | 1/1991 | Beynon | 374/131 |
| 5,007,432 A | * | 4/1991 | Keller et al. | 600/549 |
| 5,059,953 A | * | 10/1991 | Parsons et al. | 340/578 |
| 5,081,359 A | * | 1/1992 | Pompei | 250/349 |
| 5,159,200 A | * | 10/1992 | Dunbar et al. | 250/350 |

(Continued)

FOREIGN PATENT DOCUMENTS

JP 06138003 A * 5/1994

*Primary Examiner*—Gail Verbitsky
(74) *Attorney, Agent, or Firm*—Thomas N. Twomey (57) ABSTRACT

A thermal detecting device for sensing temperature at multiple locations proximate to the detecting device is provided. The detecting device has a pair of infrared detectors each configured to measure temperature of two locations by receiving infrared energy of the two locations. A housing encloses the pair of infrared detectors. The housing is configured with an aperture to allow the infrared energy of the two locations to be received by the pair of infrared detectors. A reflective mirror or two mirrors focus the infrared energy of the two locations towards the pair of infrared detectors. The detecting device may be configured to determine if there is a temperature differential at a location as the housing moves with respect to the location.

18 Claims, 5 Drawing Sheets

U.S. PATENT DOCUMENTS

| | | | |
|---|---|---|---|
| 5,218,345 A * | 6/1993 | Muller et al. | 340/578 |
| 5,331,311 A * | 7/1994 | Doctor | 340/463 |
| 5,645,349 A * | 7/1997 | Fraden | 374/120 |
| 5,668,539 A | 9/1997 | Patchell | 340/903 |
| 5,677,533 A * | 10/1997 | Yaktine et al. | 250/342 |
| 6,044,632 A * | 4/2000 | Schmalz et al. | 56/10.2 R |
| 6,222,454 B1 * | 4/2001 | Harling et al. | 340/584 |
| 6,390,672 B1 * | 5/2002 | Vail et al. | 374/170 |
| 6,470,273 B2 | 10/2002 | Halsted et al. | 701/301 |
| 6,534,752 B2 * | 3/2003 | Camm et al. | 219/497 |
| 6,696,690 B2 * | 2/2004 | Benne | 250/458.1 |
| 6,751,342 B2 * | 6/2004 | Shepard | 382/141 |
| 6,753,766 B2 * | 6/2004 | Patchell | 340/436 |
| 7,001,065 B2 * | 2/2006 | Dishaw et al. | 374/4 |
| 7,009,705 B1 * | 3/2006 | Dobbs et al. | 356/445 |
| 7,044,634 B2 * | 5/2006 | Sandvoss | 374/5 |
| 7,048,437 B2 * | 5/2006 | Bellifernine | 374/121 |
| 7,163,335 B2 * | 1/2007 | Dishaw et al. | 374/4 |
| 7,183,549 B2 * | 2/2007 | Teich et al. | 250/330 |
| 7,394,355 B2 * | 7/2008 | Sjonell | 340/435 |
| 7,439,507 B2 * | 10/2008 | Deasy et al. | 250/338.1 |
| 7,483,049 B2 * | 1/2009 | Aman et al. | 348/162 |
| 2001/0013831 A1 * | 8/2001 | Harling et al. | 340/587 |
| 2002/0126732 A1 * | 9/2002 | Shakouri et al. | 374/130 |
| 2004/0052297 A1 * | 3/2004 | McDonald et al. | 374/133 |
| 2004/0196146 A1 | 10/2004 | Harter, Jr. et al. | 340/435 |
| 2005/0134440 A1 * | 6/2005 | Breed | 340/435 |
| 2005/0211903 A1 * | 9/2005 | Harter, Jr. | 250/353 |

* cited by examiner

APPARATUS AND METHOD FOR THERMAL DETECTION

CROSS-REFERENCE TO RELATED APPLICATION

This application claims the benefit of U.S. Provisional Application No. 60/614,376, filed Sep. 29, 2004, the entire disclosure of which is hereby incorporated herein by reference.

TECHNICAL FIELD

The present invention relates generally to detecting devices and, more specifically, relates to an apparatus and method for detecting thermal radiation emission, such as thermal energy emitted from an object in a vehicle operator's blind spot.

BACKGROUND OF THE INVENTION

Motor vehicle operators are generally required to negotiate traffic safely when traveling on public roadways. For this reason, cars, trucks and other road-traveling motor vehicles are typically equipped with mirrors positioned both inside and outside the vehicle. The mirrors allow the driver to see a portion of the roadway behind or beside the host vehicle with only a slight shift of the eyes or turn of the driver's head. If other vehicles are visible, the driver will be suitably alerted and in position to avoid making an inappropriate maneuver, such as a lane change.

Being aware of other vehicles is particularly important when changing lanes on the roadway, either to the left or the right. To change lanes safely the driver needs to ascertain beforehand that there is no obstructive vehicle in the adjacent lane. However, for simple reasons of geometry the conventional side view mirrors generally only provide a partial view of the space immediately to the side and towards the back of the host vehicle, which needs to be clear for the host vehicle to change lanes. Accordingly, a space unviewable via the mirrors, commonly called the "blind spot," is therefore typically checked by the driver physically turning his or her head to the side so that the blind spot space can be viewed directly. When it is confirmed that the space is clear and that there is no other vehicle fast approaching, the driver can maneuver the host vehicle into the desired lane.

Various detection systems have been proposed for detecting objects in a vehicle blind spot region. Many of the proposed detection systems employ various types of sensors for detecting an object and alerting the driver of the host vehicle of the presence of the object in the blind spot region. One example of a detection system for detecting objects emitting thermal radiation in a blind spot of a vehicle is disclosed in U.S. patent application Ser. No. 10/407,507, filed Apr. 5, 2003, now issued as U.S. Pat. No. 6,961,006 and entitled "OBJECT DETECTION FOR A STOPPED VEHICLE," the entire disclosure of which is hereby incorporated herein by reference. The aforementioned detection approach employs a single thermal detection sensor detecting thermal radiation emitted in a single coverage zone and detects the presence of an object emitting thermal radiation based on a detected temperature radiation when the vehicle is stopped.

Another example of a proposed detection system for detecting objects in a blind spot of a vehicle is disclosed in U.S. Pat. Nos., 5,668,539 and 6,753,766, both of which are hereby incorporated herein by reference. The approaches disclosed in the aforementioned patents generally employ a plurality of infrared (IR) sensors, such as thermopile sensors, to detect changes in a thermal scene along the side of a host vehicle to detect the presence of a thermal emitting object, such as another vehicle (automobile), in the blind spot region of the host vehicle. This prior technique employs identical IR sensors positioned at predetermined locations along the side of the host vehicle to sense thermal temperature in two predetermined locations. Based on the speed of the host vehicle, the amount of time shift that is necessary to have data from the same physical area at the two different location points in time is determined. If there is a temperature increase in one of the thermal images, then it is assumed to be heat emitted from another vehicle. The heat could be heat reflected from the roadway underneath the other vehicle or heat generated at the interface of the roadway and tires of the other vehicle.

Some thermal radiation detectors employ multiple thermal detection sensors each having a separate lens element for receiving and detecting thermal energy in a coverage zone. Another thermal radiation detector is disclosed in U.S. patent application Ser. No. 10/808,835, filed Mar. 25, 2004, now issued as U.S. Pat. No. 7,148,482, and entitled "MULTIPLE SENSOR THERMAL RADIATION DETECTOR AND METHOD," the entire disclosure of which is hereby incorporated herein by reference. The aforementioned thermal radiation detector employs first and second thermal detection sensors commonly supported in a housing and arranged to detect thermal energy in first and second corresponding coverage zones by receiving thermal energy passing through an optical lens. The optical lens is arranged to direct thermal energy from the first coverage zone to the first thermal detection sensor, and to direct thermal energy from the second coverage zone to the second thermal detection sensor. The optical lens allows for focused thermal energy to be directed onto the corresponding thermal detectors, however, the optical lens approach can be susceptible to introducing thermal noise or drift, and is generally inflexible to change to allow easy use for multiple platform applications.

It is therefore desirable to provide for a cost-effective and compact thermal radiation detector that offers good signal-to-noise detection of thermal radiation in multiple coverage zones. It is further desirable to provide for a multiple zone thermal radiation detector that may be easily employed on a host vehicle for vehicle side detection and is flexible to accommodate changes.

SUMMARY OF THE INVENTION

In accordance with the teachings of the present invention, a thermal radiation detecting device is provided for sensing temperature at multiple locations proximate to the detecting device. The thermal radiation detecting device includes a first infrared detector configured to measure temperature of a first location by receiving infrared radiation from the first location. The thermal radiation detecting device also includes a second infrared detector configured to measure temperature of a second location by receiving infrared radiation from the second location. The detecting device also includes a housing for housing the first and second infrared detectors. The housing is configured to allow the infrared radiation of each location to be received therein. The detecting device further includes a reflector for directing the infrared radiation of the first location towards the first infrared detector and for directing the infrared radiation of the second location towards the second infrared detector.

According to one aspect of the present invention, the reflector includes a first mirror portion for focusing infrared radiation of the first location toward the first infrared detector and a second portion for focusing infrared radiation of the second location towards the second infrared detector. In one embodiment, the reflector comprises a pair of reflective mirrors.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
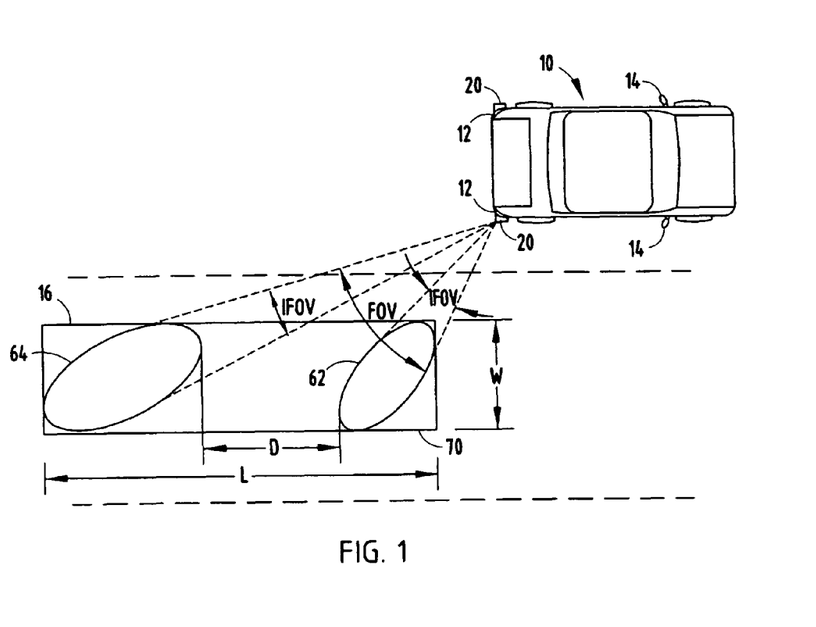
FIG. 1 is a top view of a host vehicle equipped with an object detection system employing a thermal radiation detector according to the present invention.

Referring to FIG. 1, a host vehicle 10, such as an automobile, is generally illustrated equipped with an object detection system employing a multiple sensor, thermal radiation detector 20 according to the present invention. The thermal radiation detector 20 is shown mounted on the host vehicle 10 and configured to cover multiple coverage zones (locations) in a side detection region 16 generally having a field of view (FOV). Included in the detection region 16 are first and second coverage zones 62 and 64, respectively, each having an instantaneous field of view (IFOV).

In the embodiments shown and described herein, the multiple sensor, thermal detector 20 is located within a rear tail lamp assembly 12 of the host vehicle 10. However, it should be appreciated that the thermal detector 20 may be located at various other locations onboard the host vehicle 10 to sense thermal energy (temperature) in each of the coverage zones 62 and 64. For example, the thermal detector 20 could be located on a side body panel or an exterior rearview mirror housing 14 on the host vehicle 10.

While the multiple sensor, thermal detector 20 is shown and described herein in connection with use on a host vehicle 10 for detecting objects emitting thermal radiation in a blind spot region 16 of the host vehicle 10, it should be appreciated that the thermal detector 20 may be employed at various other applications for detecting thermal radiation emitted from multiple coverage zones, without departing from the spirit of the present invention. For example, it is contemplated that the thermal detector 20 may be employed to detect the presence or motion of a person or animal passing through the coverage zones 62 and 64. It should further be appreciated that other thermal detectors 20 may be located elsewhere on the host vehicle 10, such as the opposite side of the vehicle 10 for detecting objects in adjacent lanes on either side of the host vehicle 10.

The first and second coverage zones 62 and 64 extend onto corresponding target areas on the ground surface, such as the roadway in blind spot detection region 16. Region 16 is shown generally having a length L, width W and zones 62 and 64 separated by Distance d. It should be appreciated that the thermal detector 20 detects thermal energy (heat) by detecting temperature in each of the coverage zones 62 and 64. Thermal energy may be generated and emitted by another motor vehicle, according to one embodiment, and may include thermal energy generated by the engine of the other motor vehicle which may be radiated along the roadway, or thermal energy generated by the tire/road interface of the other vehicle. Thermal energy could also be emitted from a person or other heat-emitting object(s). In the embodiment shown, the thermal detector 20 senses thermal energy temperatures in the coverage zones 62 and 64 directed toward the side of the host vehicle 10 which includes a typical side detection blind spot region 16 of the host vehicle 10.

Figure 2:
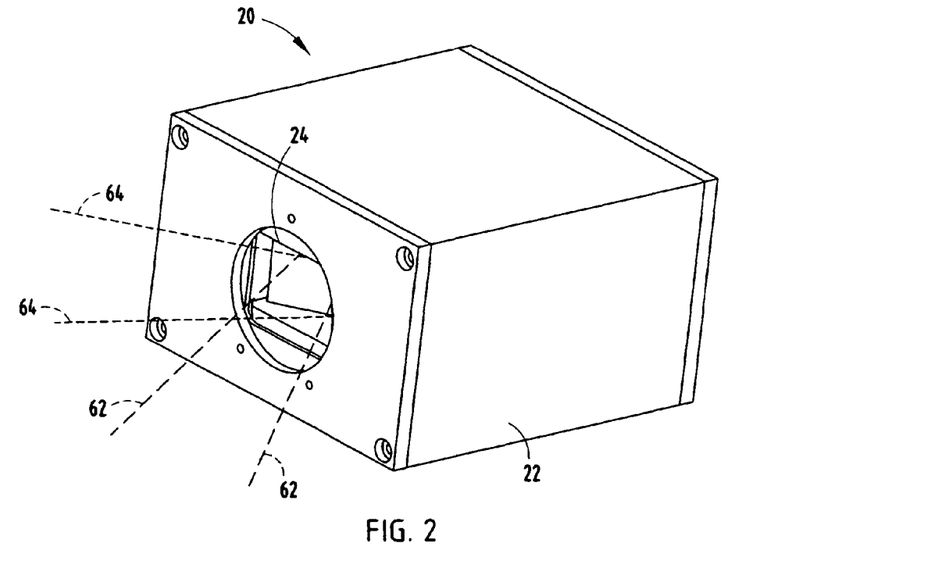
FIG. 2 is an exploded perspective view of the thermal radiation detector housed within an enclosure.
Figure 3:
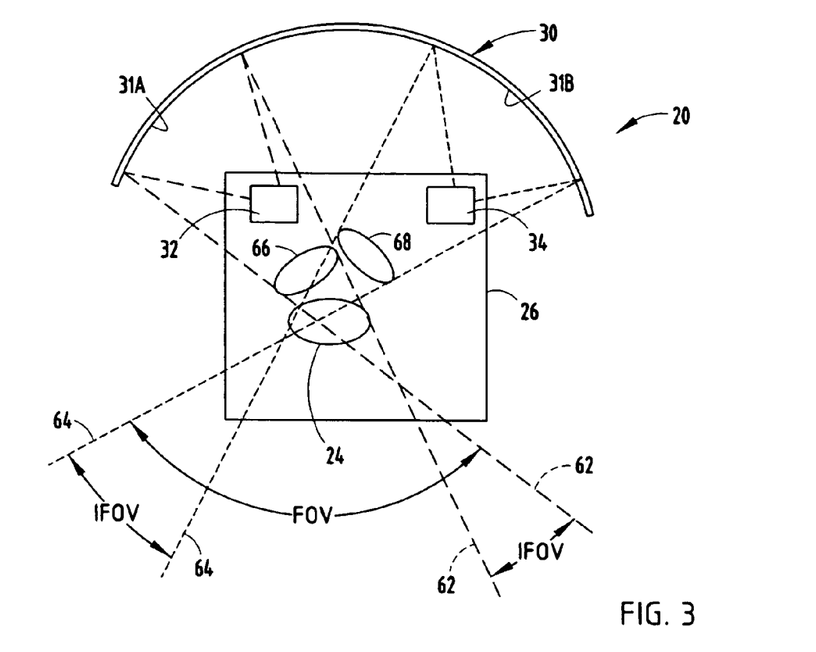
FIG. 3 is a schematic view of the thermal radiation detector employing a single compound mirror according to a first embodiment of the present invention.
Figure 4:
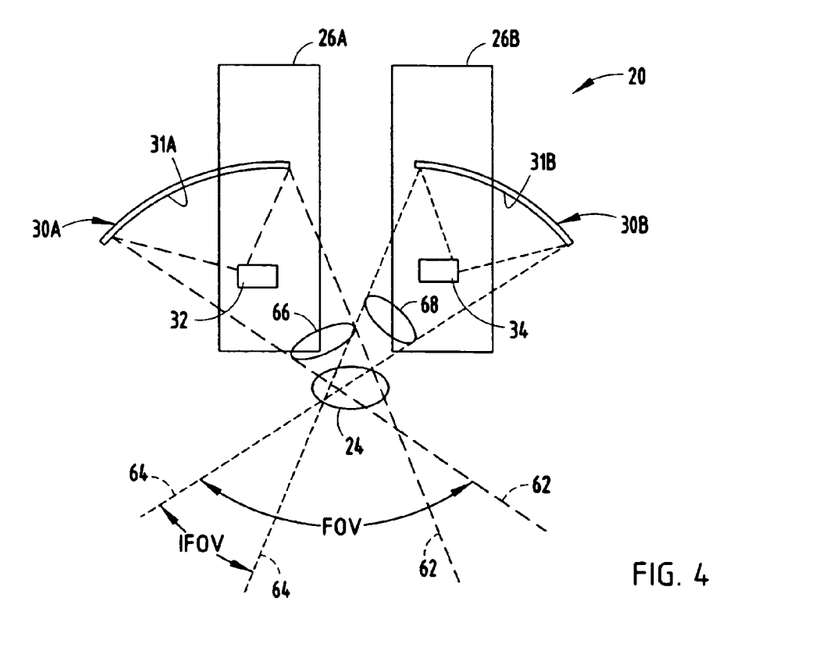
FIG. 4 is a schematic view of the thermal radiation detector employing a pair of mirrors according to a second embodiment of the present invention.

Referring to FIGS. 2-4, the multiple sensor thermal detector 20 is generally shown having an enclosure (housing) 22. Enclosure 22 may be easily mounted onto the side of the host vehicle 10, such as in the rear taillight assembly 12. Enclosure 22 includes upper, lower and side walls, and an aperture (window) 24 formed in the front wall for allowing thermal radiation from the first and second coverage zones 62 and 64 to radiate into the thermal detector 20. The thermal detector 20 may further include first and/or second more limiting apertures 66 and 68 within the housing 22 for receiving the thermal radiation in the corresponding coverage zones 62 and 64. Limiting apertures 66 and 68 may be movable and/or reconfigurable apertures that allow the instantaneous field of view of coverage zones 62 and 64 to be changed to allow for use on multiple platform applications.

With particular reference to FIG. 3, the thermal detector 20 is shown having a pair of passive infrared (IR) sensors 32 and 34 mounted on a common printed circuit board (PCB) 26. Each of the first and second sensors 32 and 34 may include any of a number of known thermal detecting sensors for detecting thermal energy applied thereto. According to one embodiment, the thermal detecting sensors 32 and 34 may each include an infrared (IR) sensor employing a thermopile sensor for sensing temperature. One example of a commercially available thermal IR sensor is Model No. ZTP315, which is commercially available from General Electric. The aforementioned infrared sensor employs a thermopile sensor as the infrared sensing element for recording remote temperature measurements and provides for signal conditioning, linearization and ambient temperature compensation.

In the embodiment of FIG. 3, the thermal detector 20 employs a single compound reflective mirror 30. The compound reflective mirror 30 has first and second mirror surface portions 31A and 31B positioned to focus and direct thermal infrared radiation from the first and second fields of view 62 and 64 onto the corresponding infrared sensors 32 and 34, respectively. The compound mirror 30 may include a parabolic or aspheric shaped mirror having a uniform reflective surface or having a special shaped surface configuration for reflecting thermal energy in a desired pattern. The reflective optical surfaces of mirror 30 may be formed from a metalized coating evacuated onto a plastic injection molded part.

Thermal radiation received from the first detection zone 62 passes through opening 24 and limiting aperture 66 and onto the first surface portion 31A of mirror 30, where the thermal energy is redirected and focused onto the first IR sensor 32.

Similarly, thermal radiation in the second detection zone 64 passes through opening 24 and limiting aperture 68 onto the second surface portion 31B of mirror 30, where the thermal energy is redirected and focused onto the second IR sensor 34. The size and shape of the detecting zones 62 and 64 may be adjusted by controlling the size of the aperture 24 and limiting apertures 66 and 68. Additionally, the shape of the first and second portions 31A and 31B of compound mirror 30 may further determine the shape and size of the detection zones 62 and 64.

Referring to FIG. 4, the thermal detector 20 is shown according to a second embodiment, which employs a pair of reflective mirrors 30A and 30B, and further employs two printed circuit boards 26A and 26B instead of a single circuit board and single compound mirror as described above in the first embodiment. In the second embodiment, the thermal detector 20 has the first IR sensor 32 mounted on the first circuit board 26A and the second IR sensor 34 mounted on the second printed circuit board 26B. The first reflective mirror 30A has a first surface 31A and is positioned to reflect and focus thermal energy received via aperture 24 and limiting aperture 66 emitted within the first detection zone 62. The second reflective mirror 30B has a second surface 31B and is located to receive thermal energy received via aperture 24 and limiting apertures 68 emitted from the second detection zone 64 which is reflected and focused onto the second IR sensor 34.

The multiple sensor, thermal radiation detector 20 is shown and described herein in accordance with embodiments employing two IR sensors 32 and 34 and two reflector surfaces 31A and 31B for sensing thermal radiation in two locations 62 and 64. However, it should be appreciated that the multiple sensor, thermal detector 20 may employ three or more IR sensors and reflective surfaces for detecting thermal radiation emitted from three or more corresponding locations, without departing from the teachings of the present invention.

Figure 5:
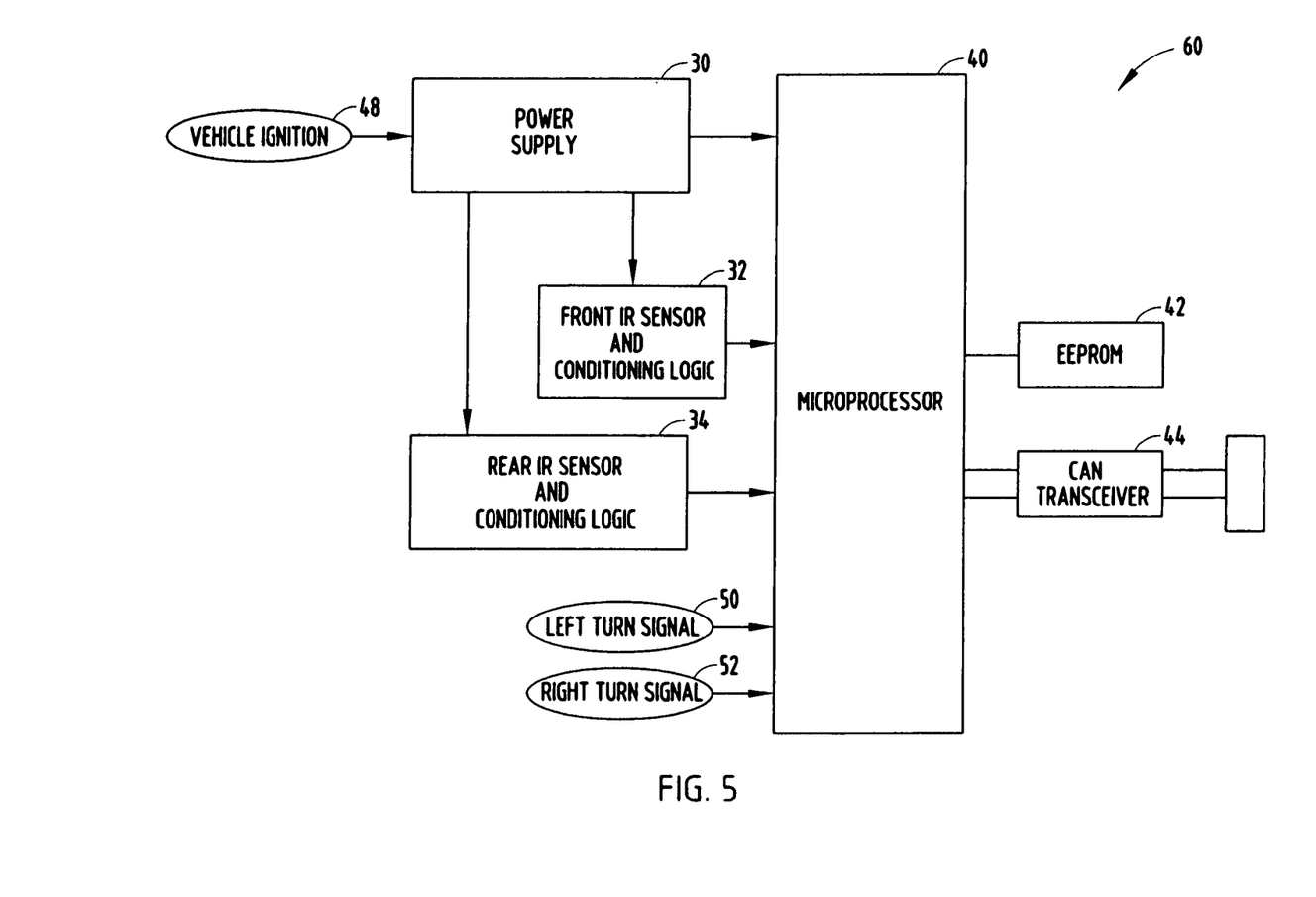
FIG. 5 is a block diagram illustrating the object detection system according to one embodiment.

Referring to FIG. 5, an object detection system 60 is shown employing the thermal detector 20 according to one embodiment. The object detection system 60 includes a microprocessor 40 for processing signal outputs from both the first and second sensors 32 and 34, in addition to processing left and right turn signal inputs 50 and 52 and a vehicle ignition input 48. When the vehicle ignition is on, power is supplied by supply 30 to IR sensors 32 and 34 and microcontroller 40, as well as other powered devices.

The microprocessor 40 may include a controller dedicated to thermal detection processing and/or target detection, or it may include a shared controller, such as a body controller of the host vehicle 10, according to one example. The microprocessor 40 may include a conventional digital microprocessor or equivalent analog circuitry capable for processing algorithms and data. Memory 42 includes electronically-erasable programmable read-only memory (EEPROM) and may include other commercially available volatile or non-volatile memory devices. Stored within memory 42 and processed by microprocessor 40 is a target detection routine 100 for detecting one or more objects emitting thermal radiation and initiating one or more countermeasures.

In accordance with an exemplary embodiment a dual-processor 40 is used for the control algorithm in order to provide the computer recourses for executing the logic of algorithm of exemplary embodiments of the present inventions. In one exemplary embodiment the dual processor contemplates the use of the EyeQ chip plus another low cost processor (e.g., the Freescale Star 12) for a vehicle CAN interface to interface with CAN transceiver 44, and other control functions that do not require much memory or processing. The Freescale Star 12 is the next generation of the Motorola "HC12" family. This is a common microcontroller in the automotive industry and is compatible with, for example, Volvo Volcano CAN protocol.

The object detection system may employ any of a number of known detecting routines for detecting objects in a vehicle operator's blind spot. An example of such a system is found in U.S. Pat. Nos. 6,753,766 and 5,668,539, the entire disclosures of which are hereby incorporated herein by reference thereto. Another detection system is disclosed in U.S. patent application Ser. No. 10/407,507, filed Apr. 5, 2003, now issued as U.S. Pat. No. 6,961,006, the entire disclosure of which is also hereby incorporated herein by reference thereto.

Figure 6:
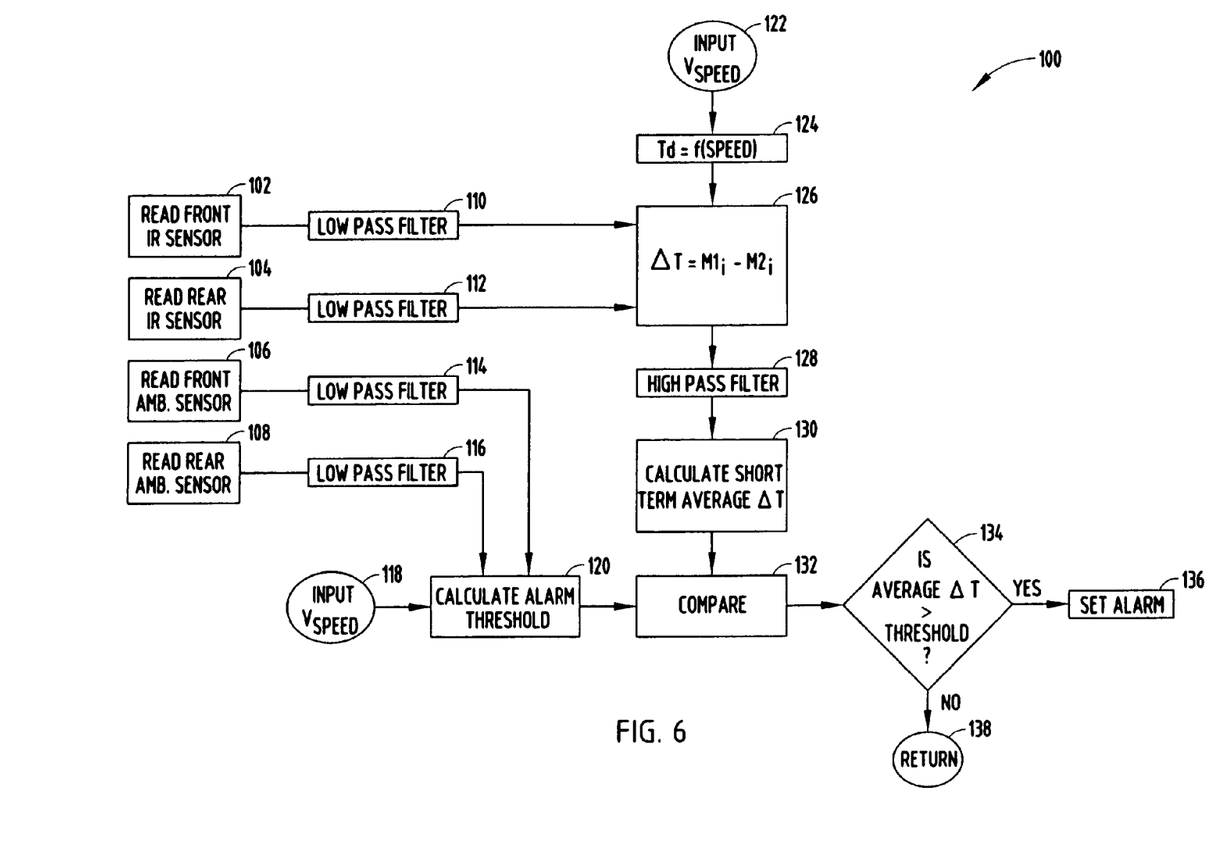
FIG. 6 is a flow diagram illustrating a routine for detecting an object with the object detection system and providing a warning indicator according to one embodiment.

An example of an object detection routine 100 is generally illustrated in FIG. 6. Routine 100 reads the front and rear IR sensors in steps 102 and 104 and filters the sensor outputs in steps 110 and 112. Similarly, routine 100 reads front and rear ambient sensors 106 and 108 for measuring ambient temperature and filters the sensed signal outputs via low pass filters 114 and 116. The filtered front and rear ambient sensed temperature is processed with vehicle speed input in step 118 to calculate an alarm threshold in step 120.

Input speed is received in step 122 and time Td to travel distance d is determined in step 124. The front and rear IR sensed signals are processed by taking the difference in corresponding sensed temperatures M1 and M2 as $\Delta T$ signals. The temperature difference $\Delta T$ is high pass filtered in step 128 and used to calculate a short term average change in temperature $\Delta T$ in step 130. The short term average $\Delta T$ is compared to the calculated alarm threshold in step 132 to determine if the average temperature $\Delta T$ is greater than the threshold in step 134 and, if so, sets an alarm in step 136 indicative of an object detected in the side detection zone. Otherwise, if the average $\Delta T$ is not greater than the threshold, the routine 100 returns to the beginning in step 138.

In an exemplary embodiment, the thermal radiation detection device uses reflective mirror optics rather than refractive lens optics to measure the temperature of one spot or location with a sensor and then after time $T_d$ wherein the temperature of the same spot is measured again with the other sensor. If no temperature $\Delta T$ is measured, the system concludes that there is no vehicle or other obstacle in the blind spot detection zone.

Exemplary embodiments of the present invention enables object detection using passive infrared (IR) sensor technology combined with reflective mirror optics. Use of reflective mirrors (especially compared to refractive approaches) offer a superior signal-to-noise relationship, which allows for increased system flexibility. The sensor assembly is constructed using low cost multiple active region IR thermopiles in conjunction with strategically placed mirrors optimized for automotive and commercial truck installations. Exemplary embodiments of the present invention are not limited to highway applications (e.g., obstacle detection for marine vehicles). Furthermore, active emitters or illuminator sources are not required for this invention to function properly. The advantage of the reflective optics of passive IR sensing compared to previous sensing systems is improved detection and performance, which can be easily adapted to predefined detection zones. Furthermore, this invention requires only one sensor assembly per detection zone.

The use of reflective optics enables the device or system to significantly increase the signal to noise ratio through improved optical efficiency and reduced transmission losses. Reflective optics also provides for better defined fields of view. A reflective optical surface provides a sharper image due to more direct focusing upon the IR sensor. Thus, the received signal strength is greater than refractive approaches since the signal is stronger and there are less transmission losses.

The increased efficiency of the reflective mirror-based detector significantly improves the ability to accurately measure the object temperature. The reflective optical detector 20 has the design advantage of being utilized with separate thermopile modules (either single or array) or as an integrated device. Furthermore, the reflective surfaces provide more flexibility in design approaches (e.g., size and location of area to be monitored).

The object detection system may operate on the following principle, according to one embodiment. First, the temperature of a given location is measured by each of the thermal IR sensors at different times. The temperature measurement of each thermal detector is then compared to determine the presence of an object in the blind spot detection zone. The presence of the object is determined based on the temperature difference exceeding an adaptive threshold. The adaptive threshold is calculated based on noise and ambient temperature measurements.

Figure 7:
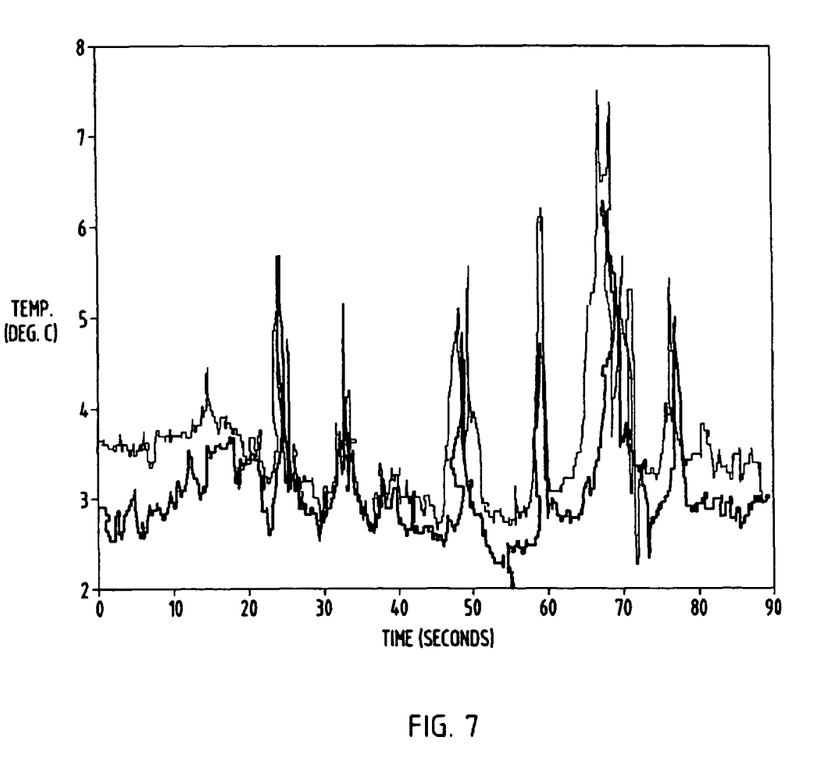
FIG. 7 is a plot of temperature data as a vehicle passes through a blind spot detection zone being monitored by the thermal detector, according to one example.

Referring now to FIG. 7, a plot of temperature data as a vehicle passes through the blind spot is illustrated. From the plot it can be determined that the large temperature swings are indicative of vehicles moving into the blind spot of the host vehicle 10.

Accordingly, a low cost blind spot thermal detector 20 has been successfully completed and analyzed with preliminary data. Exemplary embodiments of the present invention utilize reflective optics, IR sensors, control electronics and an application specific adaptive algorithm, wherein a reliable solution for detecting objects in a targeted blind spot can be achieved.

The current infrared side alert (IRSA) thermal detector 20 may be optimally mounted at a height of two feet four inches to three feet from the ground, according to one example. This provides the best tradeoff for the desired spacing between the sensor 20 and its detection spot on the roadway, viewing angle for proper object detection, and thermal energy. Alternate mounting heights may be considered and can be achieved via adjustments to the sensor mechanical internal subassemblies.

Various housing geometries for the sensor are possible to accommodate vehicle styling requirements. The sensor module can be stylized into mirrors, rear taillight assemblies, side marker lights, or other external mounting locations of interest to the vehicle designer. The sensor cannot be hidden behind fascia or other obstructions that block the reception of IR energy to the internal IR detectors.

The sensor is not impacted by rain. Accumulative snow or mud can restrict the IR detection ability to process valid object temperature information. However, in the event of a blocked sensor condition, the system will notify the driver via a fault indication.

The blind zone detection area can be adjusted by mechanically designing the sensor housing and its aperture 24 and limiting apertures 66 and 68, and aligning the internal IR detectors 32 and 34 and mirror assemblies 30 to permit aiming the IR detection zones 62 and 64 to the desired blind spot locations. The exact geometry of the blind zone detection area can be determined by the platform or by other industry standards (e.g., ISO).

As an example, one embodiment has a characteristic Field of View (FOV) of approximately sixty-two degrees (62°) with an Instantaneous Field of View (IFOV) of approximately eleven degrees (11°). When mounted at a height of thirty inches and tilted downward, the resultant detection zone coverage is approximately sixteen feet along the host vehicle in the adjacent lane. The intended sensor operating temperature range is from negative forty degrees (−40°) to eighty-five degrees (85°) C. Of course, it is understood that exemplary embodiments of the present invention are contemplated to have fields of view and incident fields of view greater or less than the aforementioned values. In addition, it is also understood that the mounting locations, housing configurations and detection zones may be greater or less than the aforementioned values.

Various housing geometries for the sensor are possible to accommodate vehicle styling requirements. The sensor modules can be stylized into mirrors, rear taillight assemblies, side marker lights, and other external mounting locations of interest to the vehicle designer as long as the sensor can still receive the IR energy necessary to determine if there is a temperature difference with respect to the roadway surface in the detection region.

The blind zone detection area can be adjusted by mechanically designing the sensor housing and aligning the internal IR detector and mirror assemblies to permit aiming the IR detection zones to the desired blind spot locations. The design options are further enhanced through the implantation of reflective optics.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A thermal radiation detecting device for sensing temperature at multiple locations proximate to a vehicle, the detecting device comprising:
   a first infrared detector located on a vehicle and configured to measure a temperature of a first location proximate to the vehicle by receiving the infrared radiation of the first location;
   a second infrared detector located on the vehicle and configured to measure a temperature of a second location proximate to the vehicle by receiving the infrared radiation of the second location, wherein said second location is substantially non-overlapping of said first location;
   a housing located on the vehicle for housing said first and second infrared detectors, said housing being configured to allow the infrared radiation of first and second locations to be received therein; and
   a reflector for directing the infrared radiation of said first location towards said first infrared detector and for directing the infrared radiation of said second location towards the second infrared detector, wherein the detecting device has an operating temperature range from −40° C. to 85° C., and said detecting device is configured to determine a temperature differential by comparing a short term average to a threshold value, said short term average being based upon the infrared radiation received by said first and second infrared detectors.

2. The detecting device as defined in claim 1, wherein said reflector comprises is a compound reflective mirror comprising first and second reflective portions.

3. The detecting device as defined in claim 1, wherein said reflector comprises first and second reflective mirrors.

4. The detecting device as defined in claim 1 further comprising a reconfigurable limiting aperture for receiving infrared radiation received from one of said first and second locations, wherein said reconfigurable limiting aperture allows an instantaneous field of view to be changed to allow for use in multiple platform applications.

5. The detecting device as defined in claim 1, wherein said first and second infrared detectors are infrared thermopiles.

6. The detecting device as defined in claim 1, wherein said first and second infrared detectors are passive infrared devices.

7. The detecting device as defined in claim 1, wherein the detecting device is employed as a vehicle blind spot detector configured to detect an object in a blind spot of the vehicle.

8. A thermal radiation detecting device for sensing temperature at multiple locations proximate to a vehicle, the detecting device comprising:
 a first infrared detector fixedly located on a vehicle and configured to measure a temperature of a first location proximate to the vehicle by receiving the infrared radiation of said first location;
 a second infrared detector fixedly located on the vehicle and configured to measure a temperature of a second location proximate to the vehicle by receiving the infrared radiation of said second location, wherein said second location is substantially non-overlapping of said first location;
 a housing located on the vehicle for housing said first and second infrared detectors, said housing being configured to allow the infrared radiation of said first and second locations to be received therein;
 a first reflector fixedly located on the vehicle for directing infrared radiation of said first location towards said first infrared detector; and
 a second reflector fixedly located on the vehicle for directing infrared radiation of said second location towards said second infrared detector, wherein the detecting device has an operating temperature range from −40° C. to 85° C., and said detecting device is configured to determine a temperature differential by comparing a short term average to a threshold value, said short term average being based upon the infrared radiation received by said first and second infrared detectors and said threshold value being based upon the infrared radiation received by said first and second infrared detectors with respect to a speed of the vehicle.

9. The detecting device as defined in claim 8 further comprising a reconfigurable limiting aperture for receiving infrared radiation received from one of said first and second locations, wherein said reconfigurable limiting aperture allows an instantaneous field of view to be changed to allow for use in multiple platform applications.

10. The detecting device as defined in claim 8, wherein the first and second reflectors each comprises a reflective minor.

11. The detecting device as defined in claim 8, wherein said first and second infrared detectors are infrared thermopiles.

12. The detecting device as defined in claim 8, wherein said first and second infrared detectors are passive infrared devices.

13. The detecting device as defined in claim 8, wherein the detecting device is employed as a blind spot detector.

14. A method for determining a temperature differential at at least one location proximate to a vehicle after the vehicle has moved in position with respect to the location, the method comprising:
 determining a temperature of the at least one location proximate to the vehicle using a pair of infrared sensors each receiving infrared energy from a reflective mirror;
 comparing said measured temperature of the at least one location by said pair of infrared temperature sensors; and
 providing an indication of a temperature differential between the measured temperature of the at least one location by said pair of infrared temperature sensors, wherein the pair of sensors have an operating temperature range of −40° C. to 85° C., and said detecting device is configured to determine a temperature differential by comparing a short term average to a threshold value, said short term average being based upon the infrared radiation received by said pair of infrared sensors, wherein said short term average is a difference in corresponding temperatures sensed by said pair of infrared sensors and said threshold value is based upon the infrared radiation received from said pair of infrared sensors with respect to a speed of the vehicle.

15. The method as defined in claim 14 further comprising the step of detecting an object in a blind spot of the vehicle based on the temperature differential.

16. The method as defined in claim 14, wherein said short term average is determined by a taking a difference in corresponding temperatures sensed by said pair of infrared temperature sensors.

17. The detecting device as defined in claim 1, wherein said short term average is a difference in corresponding temperatures sensed by said first and second detectors, and said threshold value is based upon the infrared radiation received from said first and second infrared detectors with respect to a speed of the vehicle detectors.

18. The detecting device as defined in claim 1, wherein said first and second infrared detectors and said reflector are fixedly located on the vehicle.

* * * * *